(12) United States Patent
Park

(10) Patent No.: US 9,603,502 B2
(45) Date of Patent: Mar. 28, 2017

(54) WASHING APPARATUS

(71) Applicant: Dongbu Daewoo Electronics Corporation, Seoul (KR)

(72) Inventor: Hyung Ki Park, Incheon (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 592 days.

(21) Appl. No.: 14/136,716

(22) Filed: Dec. 20, 2013

(65) Prior Publication Data

US 2015/0129002 A1    May 14, 2015

(30) Foreign Application Priority Data

Nov. 12, 2013   (KR) ........................ 10-2013-0136749

(51) Int. Cl.
| | |
|---|---|
| *A47L 15/30* | (2006.01) |
| *A47J 43/24* | (2006.01) |
| *A47L 15/00* | (2006.01) |
| *A47L 15/23* | (2006.01) |
| *A47L 15/50* | (2006.01) |

(52) U.S. Cl.
CPC ............. *A47L 15/30* (2013.01); *A47J 43/24* (2013.01); *A47L 15/00* (2013.01); *A47L 15/23* (2013.01); *A47L 15/505* (2013.01)

(58) Field of Classification Search
CPC .. A47L 15/23; A47L 15/0089; A47L 15/4221; A47L 15/30; A47J 43/24
USPC ........ 134/56 D, 176, 200, 58 D, 115 R, 111, 134/153, 198, 57 D, 157, 144, 95.3, 25.2, 134/33, 135; 68/133, 134, 23 R, 4, 207, 68/23.5, 53, 12.19; 239/251, 225.1, 261, 239/226, 245, 164, 227
See application file for complete search history.

(56) References Cited

U.S. PATENT DOCUMENTS

| | | | | |
|---|---|---|---|---|
| 1,261,778 | A | * | 4/1918 | Deming ................. A47L 15/23 134/141 |
| 1,460,400 | A | * | 7/1923 | Belknap ............. A47L 15/0047 134/158 |
| 1,755,539 | A | * | 4/1930 | Gerosa .................... A47L 15/33 134/105 |
| 1,793,798 | A | * | 2/1931 | Harker ................ A47L 15/0097 134/115 R |
| 1,952,574 | A | * | 3/1934 | Adams .................... D06F 49/06 210/237 |

(Continued)

FOREIGN PATENT DOCUMENTS

| | | |
|---|---|---|
| KR | 2019930024970 | 6/1995 |
| KR | 1020060010362 | 2/2006 |

*Primary Examiner* — David Cormier
*Assistant Examiner* — Thomas Bucci

(57) ABSTRACT

The present disclosure relates to a dishwasher, including a washing tub configured to provide a space for washing dishes; a supply tube configured to supply water into the washing tub; a motor configured to rotate the supply tube; a detachable rotating member in, on, attached to, or at an end of the supply tube, that rotates and interfaces with the supply tube; and a spin-dry tub on the rotating member, that rotates with the rotating member and spin-dries an object inside the spin-dry tub. Accordingly, a separate spin-dry function is added to the dishwasher, thereby maximizing spatial efficiency and hygienically and conveniently performing a spin-dry cycle or operation.

6 Claims, 8 Drawing Sheets

(56) References Cited

U.S. PATENT DOCUMENTS

| | | | | |
|---|---|---|---|---|
| 2,053,531 A * | 9/1936 | Parsons | A47L 15/0097 | 68/4 |
| 2,124,052 A * | 7/1938 | Clough | A47L 15/30 | 134/151 |
| 2,151,354 A * | 3/1939 | Osuch | A47L 15/0097 | 134/105 |
| 2,345,185 A * | 3/1944 | Edgar | A47L 15/0097 | 134/115 R |
| 2,500,368 A * | 3/1950 | Lund | D06F 23/04 | 210/380.2 |
| 2,549,677 A * | 4/1951 | Egerton | A47L 15/06 | 134/186 |
| 2,574,098 A * | 11/1951 | Fraraccio | C23G 5/04 | 134/135 |
| 2,603,097 A * | 7/1952 | Kelley | A47L 15/0097 | 134/115 R |
| 2,702,558 A * | 2/1955 | Blanchard | A47L 15/0089 | 134/138 |
| 3,625,233 A * | 12/1971 | Southard | A47L 15/0081 | 134/165 |
| 3,739,791 A * | 6/1973 | Fry | A47L 15/30 | 134/157 |
| 3,769,992 A * | 11/1973 | Wallestad | G03D 5/04 | 134/144 |
| 3,779,258 A * | 12/1973 | Brenner | A47L 15/502 | 134/138 |
| 3,893,843 A * | 7/1975 | Fry | A47L 15/30 | 134/10 |
| 4,127,137 A * | 11/1978 | Butcher | A47L 15/0089 | 134/174 |
| 4,263,053 A * | 4/1981 | McKinnon, Jr. | B01D 63/021 | 134/21 |
| 4,368,747 A * | 1/1983 | Taylor | A47L 15/32 | 134/138 |
| 4,412,390 A * | 11/1983 | Grant | D06F 49/003 | 188/166 |
| 4,548,221 A * | 10/1985 | Abrams | A47J 43/24 | 134/141 |
| 4,641,671 A * | 2/1987 | Nogi | A47L 15/4225 | 134/103.1 |
| 4,699,162 A * | 10/1987 | Huddle | A47L 15/32 | 134/103.2 |
| 4,718,440 A * | 1/1988 | Hawker | A47L 15/0089 | 134/141 |
| 4,836,230 A * | 6/1989 | Elliott | A47L 15/0089 | 134/138 |
| 5,027,840 A * | 7/1991 | Nezworski | B08B 3/02 | 134/111 |
| 5,154,071 A * | 10/1992 | Singh | D06F 39/083 | 68/184 |
| 5,154,200 A * | 10/1992 | Hall, Sr. | A47L 15/0073 | 134/133 |
| 5,168,888 A * | 12/1992 | Altwasser | A63B 57/60 | 134/181 |
| 5,199,281 A * | 4/1993 | Singh | D06F 39/083 | 68/207 |
| 5,205,141 A * | 4/1993 | Singh | D06F 39/083 | 68/131 |
| 5,492,137 A * | 2/1996 | Giblin | B08B 3/06 | 134/107 |
| 5,546,771 A * | 8/1996 | Bonar | A47L 15/0097 | 134/115 R |
| 5,680,779 A * | 10/1997 | Na | D06F 17/10 | 68/133 |
| 5,704,380 A * | 1/1998 | Zelniker | A47L 15/0089 | 134/153 |
| 5,749,248 A * | 5/1998 | Kim | D06F 21/08 | 68/27 |
| 5,904,163 A * | 5/1999 | Inoue | A47L 15/30 | 134/113 |
| 7,681,495 B2 * | 3/2010 | Wan | A47J 43/1018 | 34/58 |
| 2003/0079761 A1* | 5/2003 | Rich | A23N 12/023 | 134/25.3 |
| 2004/0040586 A1* | 3/2004 | Kumar | B08B 3/02 | 134/26 |
| 2007/0277855 A1* | 12/2007 | DiPanni | A23N 12/02 | 134/25.3 |
| 2008/0099055 A1* | 5/2008 | Lemley | A47L 15/502 | 134/25.2 |
| 2009/0120467 A1* | 5/2009 | Kim | A47L 15/0078 | 134/95.3 |
| 2016/0040344 A1* | 2/2016 | Li | D06F 37/264 | 8/137 |

\* cited by examiner

WASHING APPARATUS

CROSS-REFERENCE TO RELATED APPLICATIONS

This application is based on and claims priority from Korean Patent Application No. 10-2013-0136749, filed on Nov. 12, 2013, the disclosure of which is incorporated herein in its entirety by reference.

TECHNICAL FIELD

The present disclosure relates to a dishwasher and/or washing apparatus, and more particularly, to a dishwasher or similar washing apparatus having a spin-dry function.

BACKGROUND

In general, a spin-dryer for spin-drying a small number of objects, such as vegetables and fruits, can spin-dry vegetables and fruits for eating after washing the objects in water to remove harmful ingredients, such as agricultural pesticides, foreign substances, and the like. The spin-dryer can be used at home or in a restaurant.

As illustrated in FIG. 1, a spin-dryer for manually spin-drying vegetables, fruits, or a small amount of laundry includes an external container 1, a rotation net or mesh 2 that rotates around a shaft inside the external container 1, a cover 3 for closing an upper portion of the external container 1, and an operation part 4 upwardly protruding from the cover 3.

When a user rotates the operation part 4 in one direction or pushes the operation part 4 down in order to operate the spin-dryer, the rotation net 2 rotates by a separate device rotating the shaft inside the external container 1, and the object(s) in the rotation net 2 are spin-dried.

However, when spin-drying is performed by the manually operated spin-dryer, the user needs to directly rotate or operate the operation part by hand, so that it is convenient to use the spin-dryer, and the object, such as vegetables, is not divided based on a type, so that a user needs to directly divide the object after the spin-dry.

Residual water separated from the object(s) in the rotation net during spin-drying may be retained in the external container. In this case, there is a problem in that the water in the external container may flow or splash into the rotation net again. Also, the volume of such manual spin-dryers may be limited, and the operation of a manual spin-dryer generally is not automatable.

SUMMARY

The present disclosure has been made in an effort to provide a dishwasher (which has the main purpose of washing dishes) or other washing apparatus that has a separate spin-dry function, thereby conveniently and hygienically spin-drying vegetables, fruits, or a small amount of laundry. The present washing apparatus may be used at home, in a restaurant, or in a small-, medium- or large-scale food processing and/or preparation facility.

Exemplary embodiments of the present disclosure provide a dishwasher or similar washing apparatus including a washing tub configured, for example, to provide a space for washing dishes; a supply tube configured to supply water to the washing tub; a motor configured to rotate the supply tube; a detachable rotating member in fluid communication with the supply tube, configured to rotates and interface with the supply tube; and a spin-dry tub on the rotating member, configured to rotate, interface with the rotating member, and spin-dry one or more objects in the spin-dry tub.

The supply tube may include a valve configured to close or block water from being supplied into the washing tub.

The rotating member may include a balancing member on a center axis of rotation of the rotating member, and that may be oriented in a transverse direction.

The rotating member may include a drainage path inside the rotating member in fluid communication with the spin-dry tub and the supply tube.

Another exemplary embodiment of the present disclosure provides a dishwasher or other washing apparatus including a washing tub configured, for example, to provide a space for washing dishes; a supply tube configured to supply water to the washing tub; a driving motor configured to rotate the supply tube; and a detachably spin-dry assembly in fluid communication with the supply tube, configured to rotate, interface with the supply tube, and spin-dry one or more objects in the spin-dry assembly.

The spin-dry assembly may include a detachable rotating member on, attached to, or at an end of the supply tube; a fixing plate fixed onto or secured to the rotating member; and a spin-dry tub on the fixing plate configured to rotate interface with the rotating member.

A plurality of coupling protrusions may be on a lower surface of the fixing plate, the rotating member may have a plurality of coupling recesses therein, and the plurality of coupling recesses may have shapes corresponding to or matching those of the coupling protrusions. The coupling protrusions may be in, inserted into and/or fixed to the coupling recesses.

The fixing plate may include a plurality of fixing protrusions that are insertable into holes in the spin-dry tub.

The fixing plate may include a plurality of holders configured to hold ribs at, in or on a side of the spin-dry tub.

According to exemplary embodiments of the present disclosure, a separate spin-dry function capable of spin-drying vegetables, fruits, and/or a small amount of laundry can be placed in a dishwasher (of which the main purpose is to wash dishes) or other washing appliance or apparatus, thereby maximizing spatial efficiency.

Objects are separated or divided according to a type, so that it is possible to hygienically spin-dry the objects, it is possible to perform a separate dividing or separation operation after spin-drying, and it is possible to automatically spin-dry the objects using a driving force of or motor in the dishwasher, thereby maximizing the user's convenience.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
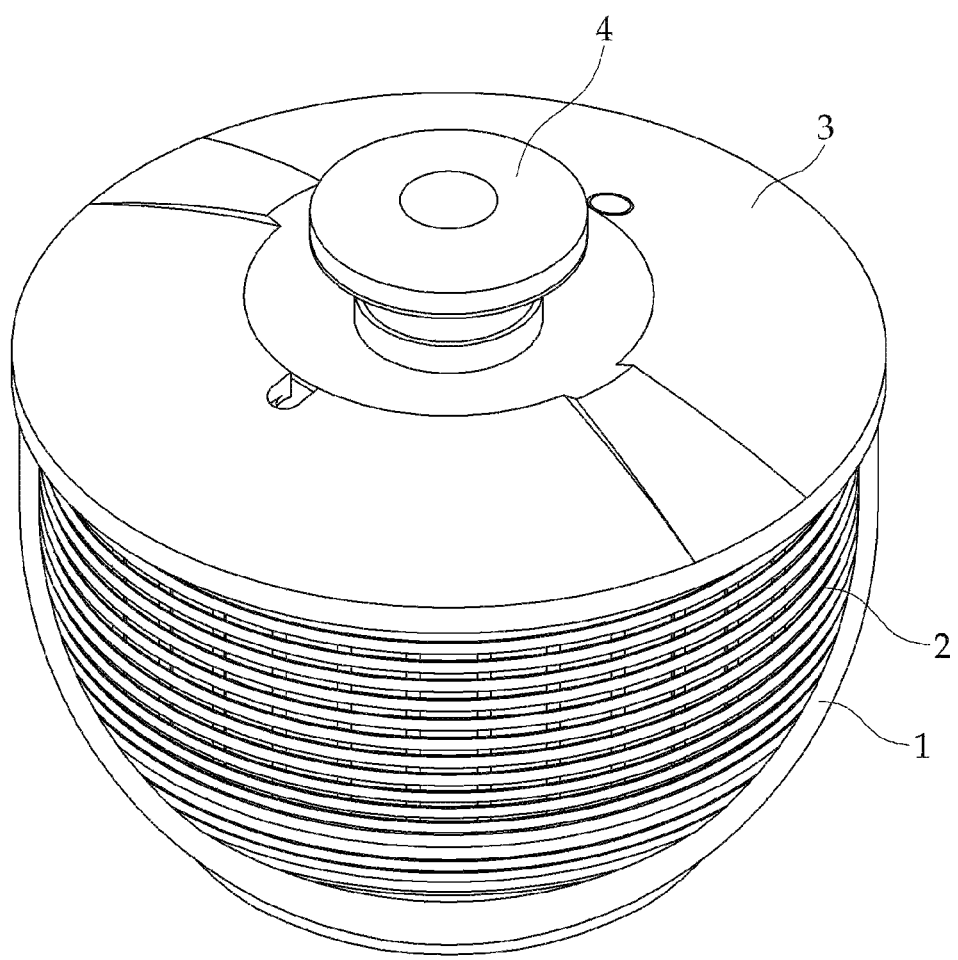
FIG. 1 is a perspective view illustrating an external appearance of a general manual spin-dryer.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, one or more embodiments according to the present disclosure will be described in detail with reference to accompanying drawings. In the process, a size or a shape of a constituent element illustrated in the drawing, and the like, may be exaggerated for clarity and ease of description. The drawings are schematic and are not necessarily dimensionally illustrated. A predetermined size is just exemplary and not limiting. Terms may be defined considering the configurations and the operations of the present disclosure, but their meanings may vary depending on the intention or usual practice of a user or operator. The terms need to be defined based on the contents throughout this specification. The spirit of the present disclosure is not limited to any particular suggested exemplary embodiment, and those understanding the spirit of the present disclosure may easily carry out another exemplary embodiment within the scope of the same spirit, which also belongs to the scope of the present disclosure as a matter of course.

As those skilled in the art will realize, the described exemplary embodiments may be modified in various different ways, all without departing from the spirit or scope of the present disclosure, which is not limited to the exemplary embodiments described herein. Like reference numerals designate like elements throughout the specification and drawings. A detailed explanation of known related functions and constitutions may be omitted when the detailed explanation obscures the subject matter of the present disclosure.

The exemplary embodiments of the present disclosure illustrate ideal exemplary embodiments of the present disclosure in more detail. As a result, various modifications of the drawings are expected. Accordingly, the exemplary embodiments are not limited to a specific form of the illustrated region, and for example, include a modification of a form by manufacturing.

Figure 2:
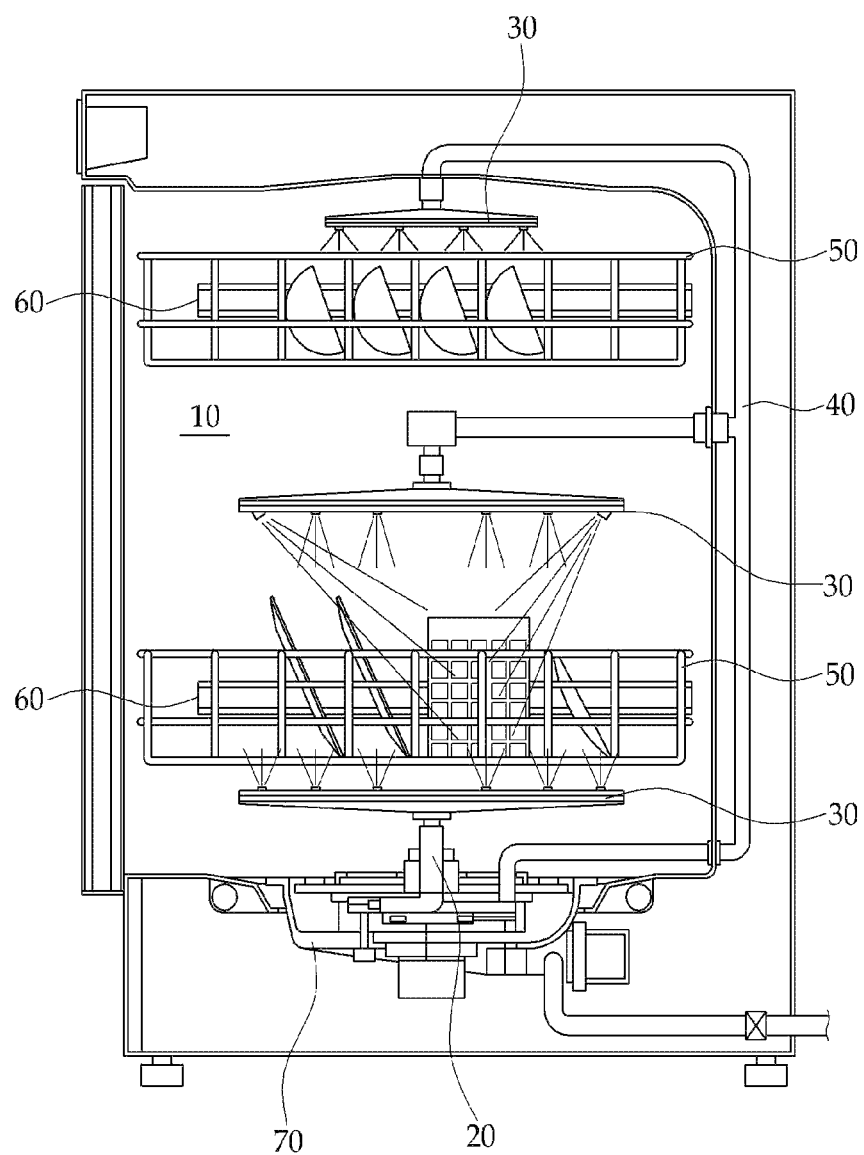
FIG. 2 is a side cross-sectional view illustrating an exemplary dishwasher according to one or more embodiments of the present disclosure.

FIG. 2 is a side cross-sectional view illustrating an exemplary dishwasher according to one or more embodiments of the present disclosure. As illustrated in FIG. 2, the dishwasher includes a washing tub 10, which provides a space for washing therein. The washing tub 10 includes a plurality of dish baskets or racks 50 (e.g., an upper basket or rack and a lower basket or rack) to hold and/or accommodate dishes, a slidable rail or bracket 60 configured to support and enable withdrawal and insertion of the dish basket or rack 50 to which the rail or bracket 60 is attached, and one or more nozzles 30 (e.g., over and/or under the upper and/or lower baskets or racks 50) configured to spray water onto items in the baskets or racks 50.

Here, each of the plurality of nozzles 30 may be individually connected to a supply tube or pipe 20 or a connection tube or pipe 40, which are, in turn, connected to and/or in fluid communication with a sump 70 to receive water from the sump 70.

A main purpose of the dishwasher is to wash dishes, but according to embodiments of the present disclosure, to improve spatial and/or processing efficiency, cleanliness and/or hygiene at home, in a restaurant, in a food processing facility, and the like, a separate spin-dry function for objects such as vegetables, fruits, small amounts of laundry, and the like, is added to the function of washing dishes, which will be described in detail with reference to FIGS. 3 and 4. Thus, in some embodiments, objects such as vegetables and fruits may be washed and spin-dried in a washing apparatus such as a dishwasher.

Figure 3:
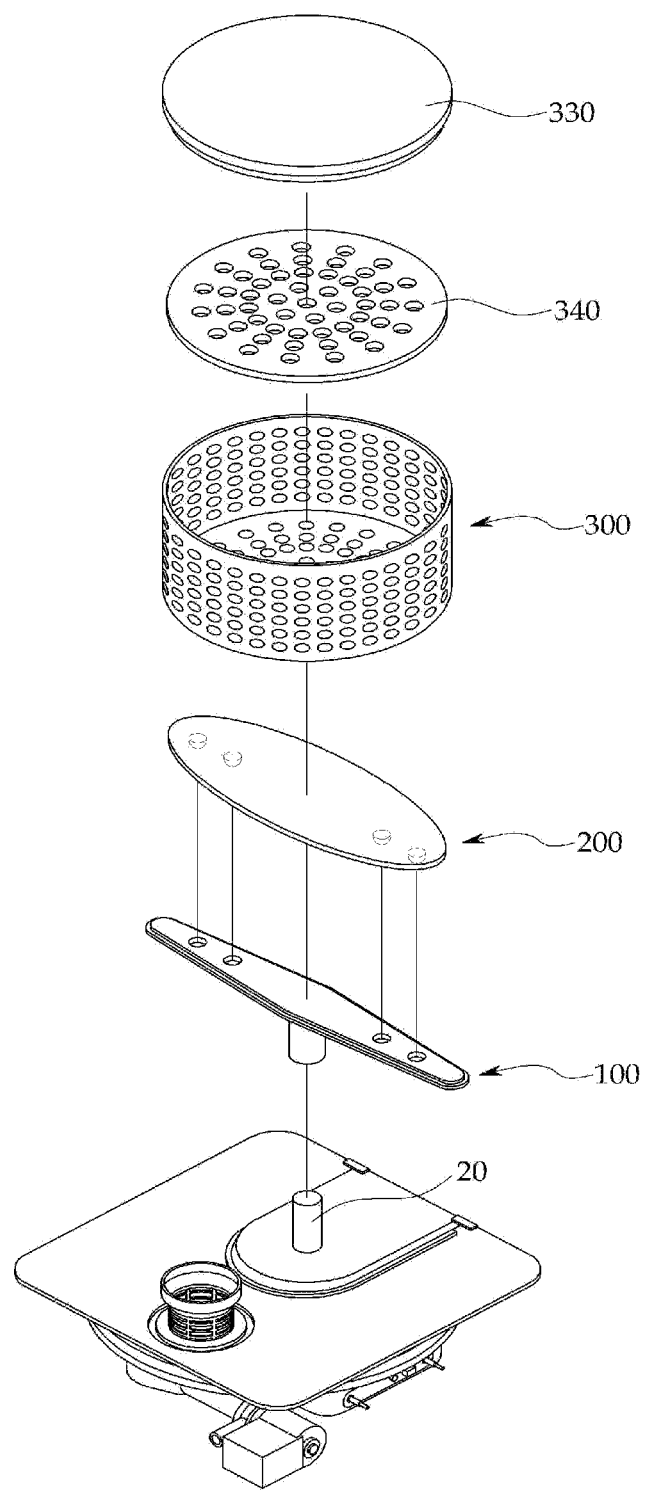
FIG. 3 is an exploded perspective view illustrating an exemplary spin-dry assembly suitable for use in the dishwasher according to embodiment(s) of the present disclosure.
Figure 4:
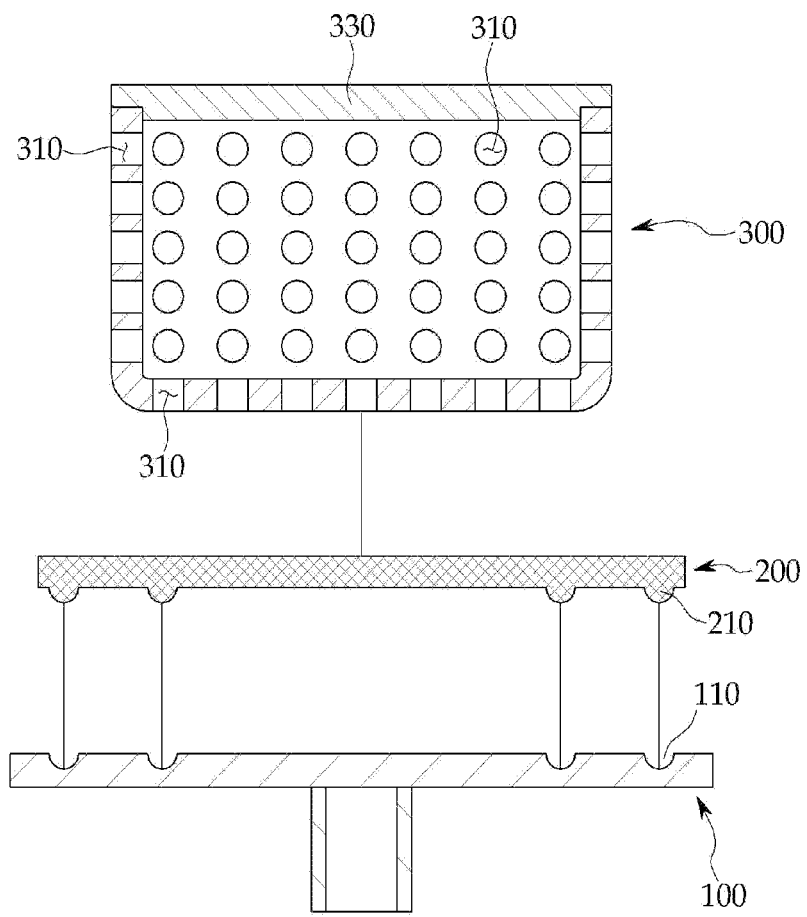
FIG. 4 is an exploded side cross-sectional view illustrating the exemplary spin-dry assembly suitable for use in the dishwasher according to embodiment(s) of the present disclosure.

FIGS. 3 and 4 are an exploded perspective view and an exploded side cross-sectional view illustrating an exemplary spin-dry assembly suitable for use in the dishwasher according to embodiments of the present disclosure, respectively. For example, the dishwasher may include a washing tub (not illustrated), the supply tube 20, a motor (not illustrated), and a spin-dry assembly.

The washing tub provides a space for washing dishes, and provides a spin-dry space during a spin-dry cycle or operation.

When the dishwasher is used for the purpose of washing dishes, the supply tube 20 is connected to nozzles (not illustrated) for spraying water onto the dishes in the washing tub.

When the dishwasher is used for the purpose of spin-drying objects according to embodiments of the present disclosure, the supply tube 20 supports the spin-dry assembly inside the washing tub, and serves as a rotation center shaft of the spin-dry assembly.

That is, each of the nozzle and the spin-dry assembly is detachable from the supply tube 20, and thus when the dishes (or other objects) are washed, the nozzle is coupled to the supply tube 20 so that the dishwasher is used for the purpose of washing dishes (or other objects). When a spin-dry cycle or operation is performed, the spin-dry assembly may be coupled to the supply tube 20 so that the dishwasher is used for the purpose of spin-drying.

The motor provides a driving force to rotate the supply tube 20 during the spin-dry cycle or operation.

In the general dishwasher, the supply tube 20 does not rotate, and the nozzle rotates by the spraying pressure (e.g., in a particular direction or directions) of the washing water, but when the dishwasher is used for the purpose of spin-drying according to embodiments of the present disclosure, the supply of water to the supply tube 20 may be blocked, and a separate driving force rotates the spin-dry assembly on or coupled to the supply tube 20.

Accordingly, the present disclosure includes a separate driving motor for rotating the supply tube 20 during the spin-dry cycle or operation to provide rotational driving force to the supply tube 20. When the dishwasher is used for the purpose of washing dishes, the driving motor is not operated, and the nozzle rotates by the (directional) spraying pressure of the washing water as a matter of course.

In the meantime, when the dishwasher is used for the purpose of spin-drying, a separate valve 22 (see FIG. 12) may be in the supply tube 20 to block the supply of washing water to (e.g., close) the supply tube 20.

That is, the valve 22 closes the supply tube 20 during the spin-dry cycle or operation, and open the supply tube 20 during the dishwashing cycle or operation to supply water to the nozzle(s).

The spin-dry assembly is detachable from the supply tube 20, and rotates while interfacing with the rotating supply tube 20 to spin-dry the objects therein during the spin-dry cycle or operation of the dishwasher.

Alternatively, the spin-dry assembly can have a mounting tube on an underside thereof with an inner diameter that is greater than the outer diameter of the supply tube 20, and the spin-dry assembly can be mounted on the supply tube 20 and rotate freely around the supply tube 20. The motor can provide a force to the underside of the spin-dry assembly (e.g., by blowing air through the supply tube 20 into directional channels in the spin-dry assembly) to rotate the spin-dry assembly, without rotating the supply tube 20.

The spin-dry assembly includes a rotating member 100, a fixing plate 200, and a spin-dry tub 300.

A shape of the rotating member 100 is similar to the shape of the general dishwasher nozzle that is detachable from the supply tube 20 as illustrated in FIGS. 3 and 4.

The fixing plate 200 is fixed or secured onto the rotating member 100 to provide a seating space for the spin-dry tub 300, and the spin-dry tub 300 is seated on the fixing plate 200 and rotated while interfacing with (e.g., secured to) the rotating member 100 to spin-dry the objects put into the spin-dry tub 300.

The spin-dry tub 300 provides a space for spin-drying the object(s), and according to embodiment(s) of the present disclosure, the spin-dry tub 300 may have a cylindrical shape with an opening in the upper surface, panel or portion, as illustrated in FIG. 3.

The spin-dry tub 300 may have a cross-section shaped like a triangle, a rectangle, a square, or a polygon, rather than a circle, and be optimized for the type of spin-drying object (e.g., laundry, cabbage, cucumbers, radishes, etc.), and the contents of the present disclosure are not limited by the shape of the spin-dry tub 300.

A plurality of spin-dry holes 310 are in side surfaces and the lower surface of the spin-dry tub 300 so that residual water may be discharged to the washing tub of the dishwasher during the spin-dry operation, and a detachable cover 330 is at an upper portion (e.g., on or over the opening) of the spin-dry tub 300 to prevent the objects from being ejected or separated from the spin-dry tub 300 during the spin-dry operation.

A separation plate 340 for dividing the space in the spin-dry tub 300 (e.g., for separating objects into an upper portion and a lower portion) may be placed inside the spin-dry tub 300, and another plurality of spin-dry holes may be in the separation plate 340 (similar to the spin-dry tub 300). In one embodiment, a first group of objects to be spin-dried may be placed on a bottom surface of the spin-dry tub 300, the separation plate 340 may be place thereon, then a second group of objects to be spin-dried may be placed on the separation plate 340. This may be an efficient process for spin-drying certain leafy vegetables such as lettuce, cabbage, spinach, kale, collards, mustard and other greens, chard, etc.

In addition, objects such as vegetables and fruits may be divided according to the type by the separation plate 340, and the spin-dry cycle or operation may be performed, so that a user does not need to separate the objects after the spin-dry operation is terminated.

According to embodiments of the present disclosure, the fixing plate 200 and the spin-dry tub 300 are rotated with the rotating member 100 during the spin-dry cycle or operation in the spin-dry assembly, and the fixing plate 200 is fixed or secured to the rotating member 100.

Referring to FIG. 4, a plurality of coupling protrusions 210 may be on a lower surface of the fixing plate 200, a plurality of coupling recesses 110 each having a shape corresponding to that of a corresponding coupling protrusion 210 is in an upper surface of the rotating member 100, and the coupling protrusions 210 are insertable into the coupling recesses 110. Once the coupling protrusions 210 are inserted into the coupling recesses 110, the fixing plate 200 is secured to the rotating member 100.

FIGS. 5 to 8 are side cross-sectional views illustrating exemplary structures of the coupling recesses in the rotating member and the coupling protrusions on the fixing plate according to various embodiments of the present disclosure, and hereinafter, the coupling structure of the rotating member 100 and the fixing plate 200 will be described in detail.

Figure 5:
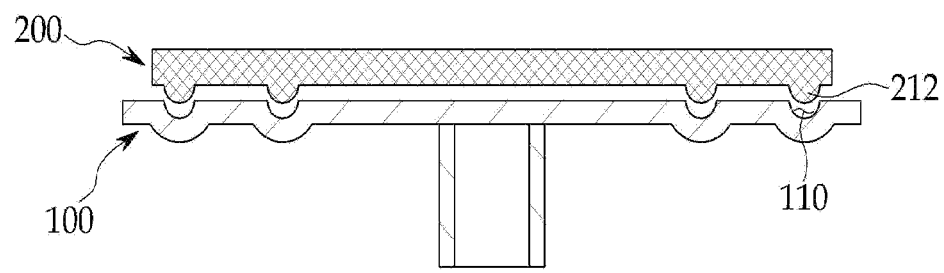
FIG. 5 is a side cross-sectional view illustrating an exemplary coupling structure of a rotation member and a fixing plate suitable for use in the dishwasher according to embodiment(s) of the present disclosure.
Figure 6:
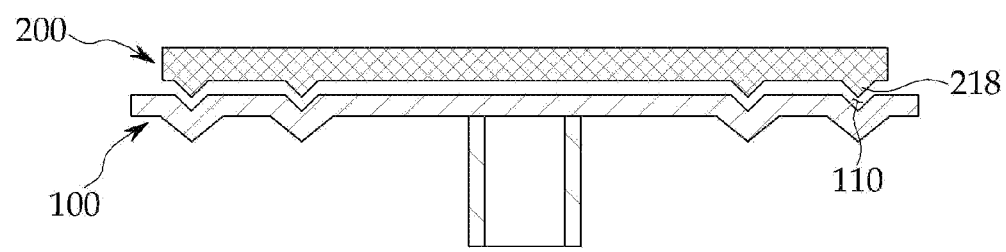
FIG. 6 is a side cross-sectional view illustrating an exemplary coupling structure of a rotation member and a fixing plate suitable for use in the dishwasher according to one or more additional or other exemplary embodiments of the present disclosure.
Figure 7:
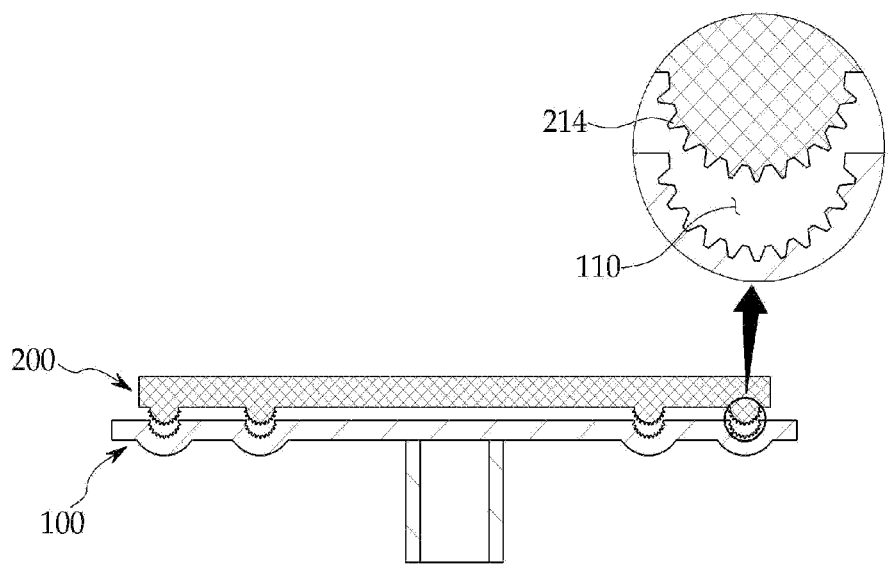
FIG. 7 is a side cross-sectional view illustrating an exemplary coupling structure of a rotation member and a fixing plate suitable for use in a dishwasher according to embodiment(s) of the present disclosure.

First, as illustrated in FIG. 5, the coupling protrusion 210 may comprise a semicircular or hemispherical protrusion 212 that may be inserted into and secured to a complementary coupling recess 110 having a shape corresponding to the protrusion 212. When viewed face-on, the protrusion 212 may have a circular or elliptical shape or base, for example, As illustrated in FIG. 6, the coupling protrusion 210 may comprise an edge type protrusion 218 that may be inserted into and secured to a complementary coupling recess 110 having a shape corresponding to the edge type protrusion 218. The edge type protrusion 218 may have a triangular or V-shaped cross-section, and when viewed face-on, the protrusion 218 may have a circular, elliptical, square or rectangular shape or base, for example, As illustrated in FIG. 7, in order to increase the force with which the coupling protrusion 210 is secured to the coupling recess 110, the coupling protrusion 210 may comprise a semicircular or hemispherical protrusion with unevennesses or microprotrusions 214 (e.g., having a saw-toothed or serrated cross-section) on an outer peripheral surface thereof, to be inserted into and secured to complementary coupling recesses 110 having a shape corresponding to the protrusions 214.

Figure 8:
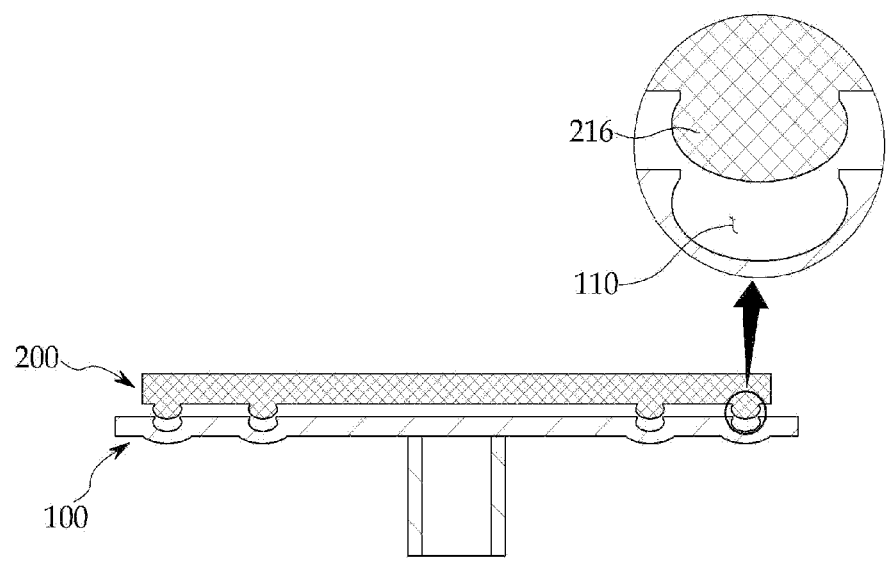
FIG. 8 is a side cross-sectional view illustrating an exemplary coupling structure of a rotation member and a fixing plate suitable for use in a dishwasher according to one or more additional or other embodiments of the present disclosure.

Finally, as illustrated in FIG. 8, in order to increase the force with which the coupling protrusion 210 is secured to the coupling recess 110, the coupling protrusion 210 may comprise a more spherical protrusion 216, which may comprise a relatively soft material having a predetermined minimum elasticity, insertable into and securable to a complementary coupling recess 110 having a shape corresponding to the substantially spherical protrusion 216.

According to embodiments of the present disclosure, the rotating member 100 may be elongated (e.g., in a longitudinal direction), and a width of the fixing plate 200 may be larger than the width of the rotating member 100. Consequently, a balancing member 120 may be in, on or under the rotating member in order to stably support the fixing plate 200 on the rotating member 100.

Figure 9:
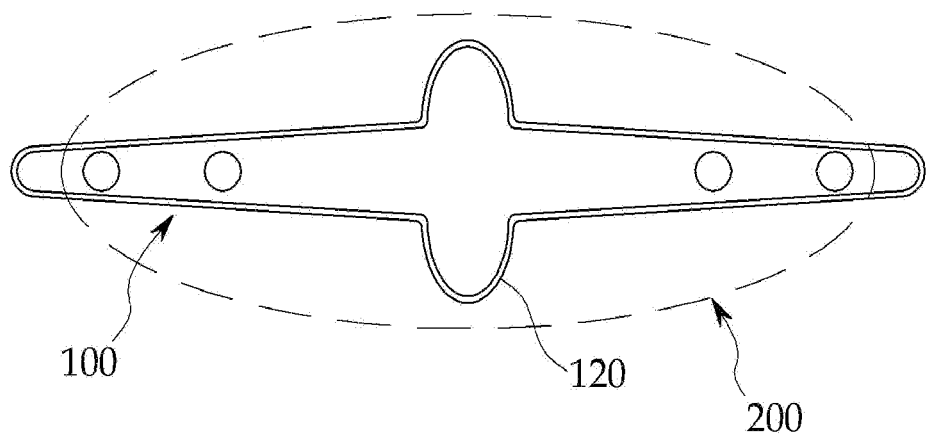
FIG. 9 is a plan view illustrating an exemplary rotation member suitable for use in the dishwasher according to embodiment(s) of the present disclosure.

As illustrated in FIG. 9, the balancing member 120 is disposed or oriented in a transverse direction on or over a center axis of the rotating member 100 (e.g., perpendicular to a long axis of the rotating member 100). With the balancing member 120, the rotating member 100 may stably support an area of the fixing plate 200 across two dimensions (e.g., including in a width direction) of the fixing plate 200.

Here, the balancing member 120 may be integral with the rotating member 100, or separately formed from the rotating member 100 as necessary or desired.

As described above, according to embodiments of the present disclosure, the fixing plate 200 and the spin-dry tub 300 are rotated while interfacing with the rotating member 100 during the spin-dry cycle or operation in the spin-dry assembly, so that the spin-dry tub 300 is fixed or secured to the fixing plate 200.

Figure 10:
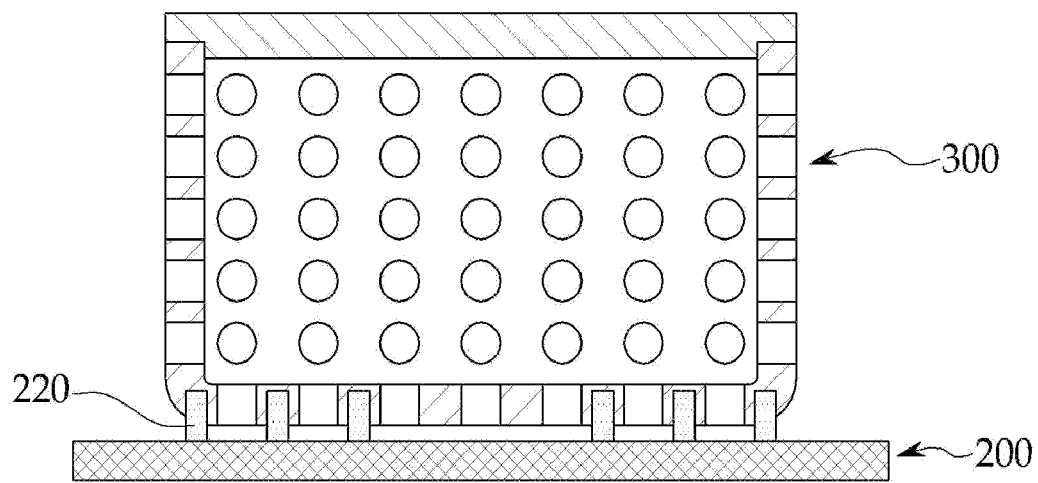
FIG. 10 is a side cross-sectional view illustrating an exemplary coupling structure of a fixing plate and a spin-dry tub suitable for use in the dishwasher according to embodiment(s) of the present disclosure.
Figure 11:
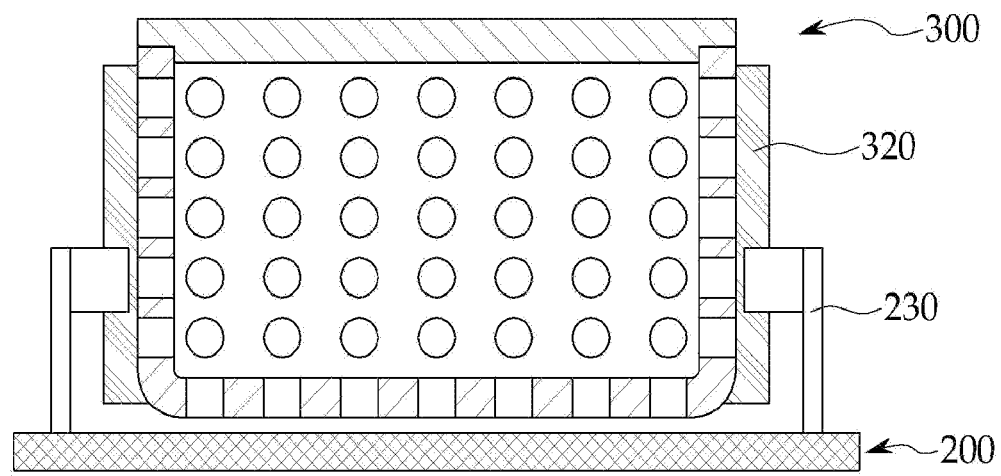
FIG. 11 is a side cross-sectional view illustrating an exemplary coupling structure of a fixing plate and a spin-dry tub suitable for use in the dishwasher according to one or more additional or other embodiments of the present disclosure.

FIGS. 10-11 are side cross-sectional views illustrating exemplary coupling structures of the fixing plate and the spin-dry tub according to various embodiments of the present disclosure. Hereinafter, the coupling structure of the fixing plate 200 and the spin-dry tub 300 will be described in detail.

As illustrated in FIG. 10, according to embodiment(s) of the present disclosure, a plurality of fixed protrusions 220 protrude or extend from an upper surface of the fixing plate 200, and the fixed protrusions 220 are inserted into holes 310 in a lower surface of the spin-dry tub 300. As a result, the spin-dry tub 300 is fixed or secured to the fixing plate 200.

Alternatively, as illustrated in FIG. 11, according to another embodiment of the present disclosure, a plurality of holders 230 are at or on an upper surface or edge of the fixing plate 200, and the holders 230 hold a fixing rib or extension 320 on a side surface of the spin-dry tub 300. As a result, the spin-dry tub 300 is fixed or secured to the fixing plate 200.

A separate friction pad (not illustrated) may be on the fixing plate 200 to increase frictional forces between the fixing plate 200 and the spin-dry tub 300, and thus stably support the spin-dry tub 300 on the fixing plate 200.

As a result, according to the present disclosure, a spin-dry assembly structure may include the rotating member 100, the fixing plate 200, and the spin-dry tub 300, firmly coupled to one another, so that the rotational force of the rotating member 100 (which may have an upper surface with a first shape) is stably transmitted to the spin-dry tub 300 (which may have a lower surface with a different shape).

Figure 12:
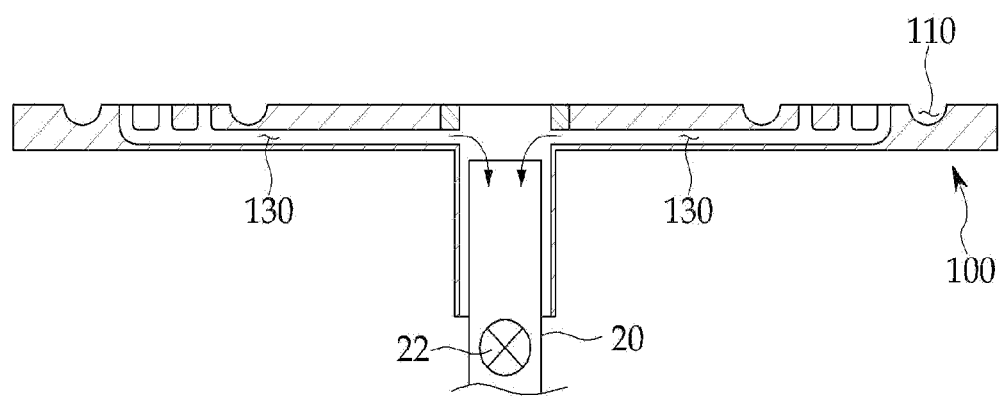
FIG. 12 is a side cross-sectional view illustrating an exemplary coupling structure of the rotation member and a supply tube suitable for use in a dishwasher according to embodiment(s) of the present disclosure.

FIG. 12 is a side cross-sectional view illustrating an exemplary coupling structure for the rotating member and the supply tube of the dishwasher according to one or more embodiments of the present disclosure. A drainage path 130 for fluidly communicating the spin-dry tub 300 with the supply tube 20 is inside the rotating member 100.

That is, residual water discharged from the spin-dry holes 310 in the lower surface of the spin-dry tub 300 during the spin-dry cycle or operation may be discharged by the drainage path 130, so that the residual water does not remain in or between the rotating member 100, the fixing plate 200, and the spin-dry tub 300. As a result, the probability of residual water splashing or flowing back onto the spin-dried objects is reduced, and the frictional force between the elements of the spin-dry assembly may be increased.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A dishwasher, comprising:
a washing tub configured to provide a space for washing dishes;
a supply tube configured to supply water into the washing tub;
a motor configured to rotate the supply tube; and
a detachable spin-dry assembly in fluid communication with the supply tube, wherein the spin-dry assembly is rotated while interworking with a rotation of the supply tube to spin-dry an object inside the spin-dry assembly,
wherein the spin-dry assembly includes:
a detachable rotating member on, attached to, or at an end of the supply tube; and
a spin-dry tub on or over the rotating member,
wherein the spin-dry assembly further includes a fixing plate fixed on or secured to the rotating member, and the spin-dry tub is on the fixing plate and rotates with the fixing plate and the rotating member,
wherein the fixing plate has a lower surface with a plurality of coupling protrusions thereon, the rotating member has an upper surface with a plurality of coupling recesses therein.

2. The dishwasher of claim 1, wherein each of the coupling recesses has a shape corresponding to or matching a shape of one of the coupling protrusions, and the coupling protrusions are in the coupling recesses.

3. The dishwasher of claim 1, wherein the fixing plate includes a plurality of fixing protrusions insertable into holes in the spin-dry tub.

4. The dishwasher of claim 1, wherein the fixing plate includes a plurality of holders configured to hold ribs or extensions at or on a side of the spin-dry tub.

5. A washing apparatus, comprising:
a washing tub;
a supply tube configured to supply water into the washing tub;
a spin-dry assembly on the supply tube, configured to rotate and spin-dry an object inside the spin-dry assembly; and
a motor configured to rotate at least one of the supply tube and the spin-dry assembly,
wherein the spin-dry assembly includes a rotating member in fluid communication with the supply tube, configured to rotate and receive water from the supply tube,
wherein the spin-dry assembly includes a detachable spin-dry tub on the rotating member, configured to rotate with the rotating member and spin-dry an object inside the spin-dry tub, further comprising a fixing plate fixed on or secured to the rotating member, and the spin-dry tub is on the fixing plate and rotates with the fixing plate and the rotating member, wherein the fixing plate has a lower surface with a plurality of coupling protrusions thereon, the rotating member has an upper surface with a plurality of coupling recesses therein, and the coupling protrusions fit into or mate with the coupling recesses.

6. The washing apparatus of claim 5, wherein the fixing plate includes a plurality of fixing protrusions insertable into holes in the spin-dry tub.

* * * * *